Nov. 8, 1966  W. KASTEN  3,283,477

FUELER UNIT

Filed Sept. 28, 1964  2 Sheets-Sheet 1

INVENTOR.
WALTER KASTEN
BY
William N. Antonis
ATTORNEY

Nov. 8, 1966   W. KASTEN   3,283,477
FUELER UNIT

Filed Sept. 28, 1964   2 Sheets-Sheet 2

INVENTOR.
WALTER KASTEN
BY
William N. Antonis
ATTORNEY

3,283,477
FUELER UNIT
Walter Kasten, Madison Heights, Mich., assignor to The Bendix Corporation, Madison Heights, Mich., a corporation of Delaware
Filed Sept. 28, 1964, Ser. No. 399,620
2 Claims. (Cl. 55—170)

This invention relates to components of a fueling system and more particularly to a single fueler unit which combines such components in a novel and unique manner.

Accordingly, it is an object of this invention to provide a single fueler unit which functions as a filter water separator, air eliminator, and fuel cleanliness monitor.

Another object of this invention is to provide a single fueler unit of the type described which includes a shunt valve for by-passing, under certain circumstances, the fuel cleanliness monitor portion of said unit.

A further object of this invention is to provide a single fueler unit of the type described wherein air elimination effectiveness is improved because utilization of the whole unit as the air eliminator housing reduces turbulence therein.

A still further object of this invention is to provide a fueler unit of the type described wherein the arrangement of the filter water separator, air eliminator and fuel cleanliness monitor is such that the components of the monitor improve the efficiency of the air eliminator by offering additional restriction to the flow of air and actually acting as an air separator by, in effect, mechanically "scrubbing" any existing air bubbles from the fuel passing therethrough.

Another object of this invention is to provide a fueler unit of the type described wherein the air eliminator portion thereof includes a float operated valve which permits air and fuel vapors to pass therethrough until liquid fuel in the unit rises to a predetermined level at which time discharge of air and fuel through the air eliminator port is prevented.

A further object of this invention is to provide a fueler unit of the type described wherein a common division plate is utilized to mount the elements of the fuel filter water separator and fuel cleanliness monitor.

Other objects and advantages will become apparent from the following description and accompanying drawings wherein.

Figure 1:
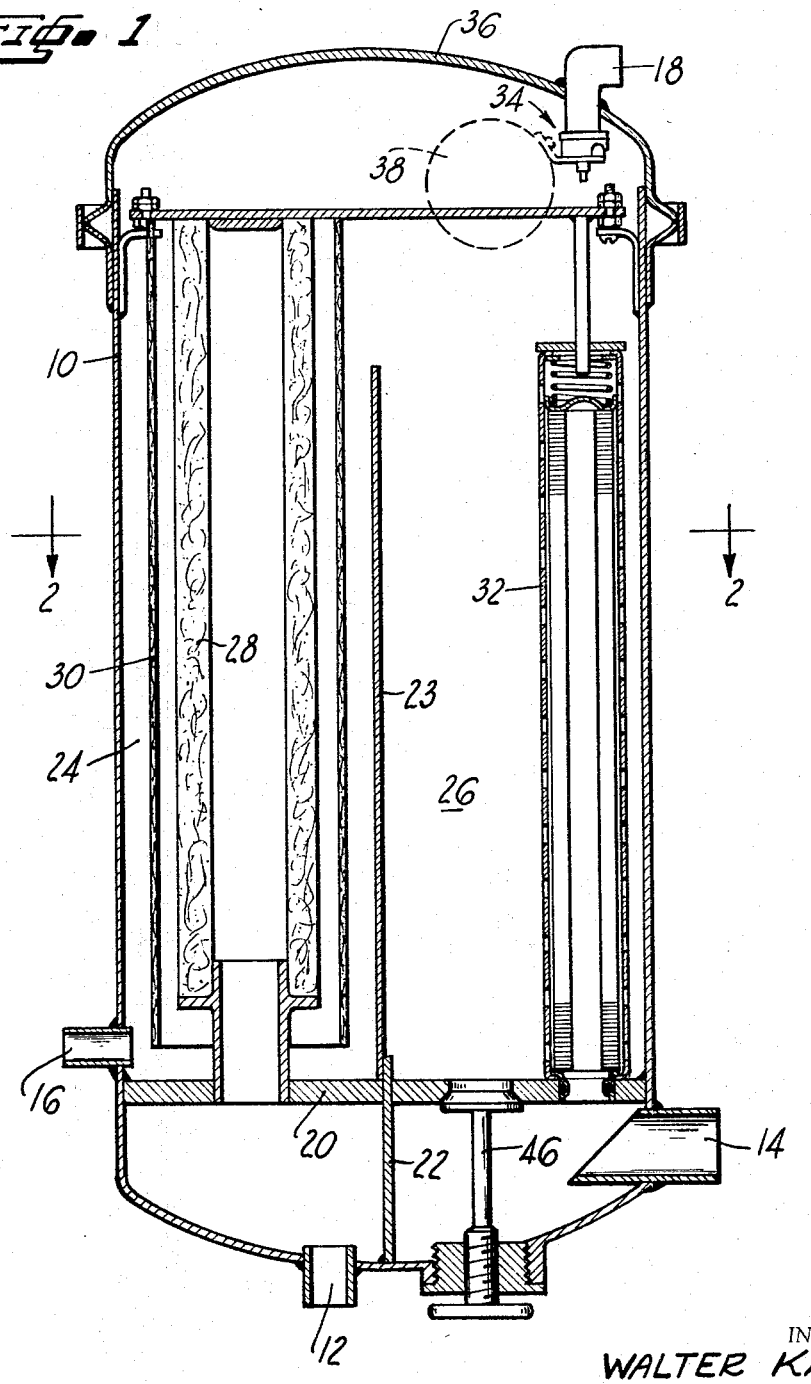
FIGURE 1 is a sectional view of a fueler unit arranged in accordance with my invention.
Figure 2:
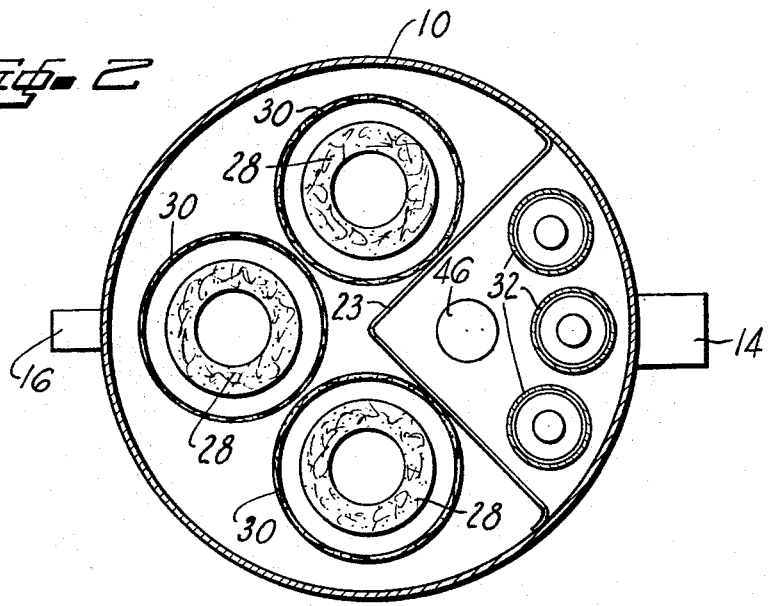
FIGURE 2 is a sectional view taken along line 2—2 of FIGURE 1.

Referring to the drawings, it will be seen that the fueler unit comprises a housing 10 having a fuel inlet port 12, a fuel outlet port 14, a water drain port 16, and an air eliminator port 18. These ports are separated from each other by a horizontal division plate 20 and a vertical division plate 22. A vertical partition 23 divides the housing into a first chamber 24 which contains the fuel filter water separator components and a second chamber 26 which contains the fuel cleanliness monitor components.

More specifically, the first chamber 24 contains three conventional first stage fiberglass coalescer elements 28, each of which is surrounded by a polytetrafluorethylene coated stainless steel screen type canister 30 which functions as the second stage water separator element. The coalescer elements trap solid contaminants in the fuel flowing therethrough from the inside thereof to the outside thereof and coalesces any water contained in the fuel into relatively large droplets. The second stage separator elements will trap any additional solid contaminants in the fuel and will separate the water droplets, from the fuel so that the droplets may flow through the drain port 16. The second chamber 26, which is downstream of the first chamber and is separated therefrom by the vertical partition 23, contains three edge-type GO-NO-GO fuel cleanliness monitor shut-off fuses 32 of the type described in my Patent No. 3,117,925. These fuses are sufficiently sensitive to predetermined levels of both solid and water contaminants so that closure of the fuse pores will occur when the predetermined levels are reached. Upon such closure further flow through the fuel outlet port 14 is prevented.

Figure 3:
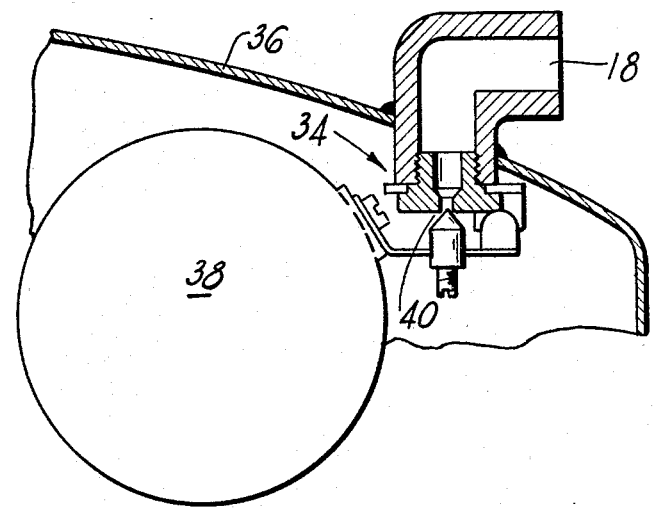
FIGURE 3 is an enlarged sectional view of the air eliminator utilized in the fueler unit shown in FIGURE 1.

Downstream of the filter water separator elements and upstream of the GO-NO-GO fuses is an integral air eliminator mechanism 34. As shown in FIGURES 1 and 3, this mechanism is a float operated stainless steel valve mounted to the cover 36 of the housing for controlling flow through air eliminator port 18. Since port 18 is connected to the fuel tank (not shown) by a flexible metal hose (not shown), all air and fuel vapors separated by the filter water separator elements will pass through the float valve into the fuel tank. As the vapors are expelled and the level of the fuel rises above the top of the vertical partition 23 separating the filter-water separator elements and GO-NO-GO fuses, the float 38 will gradually shut-off flow through the air eliminator port 18 and prevent the discharge of fuel.

Since the air eliminator mechanism is downstream of the filter water separator components, only filtered fuel comes in contact with the float valve 40. Furthermore, the location of the GO-NO-GO fuses downstream of the air eliminator mechanism improves the efficiency of the air eliminator. This is due to the fact that the fuses offer additional restriction to the flow of air and actually act as an air separator. Whereas conventional air eliminators, which are relatively small in volume, principally separate air by setling due to differences in specific gravity, they cannot separate small entrained air bubbles in the fuel. However, by placing the fuses 32 downstream of the air eliminator mechanism 34, the fuses will in effect mechanically "scrub" these small air bubbles from the fuel. This results in more effective air elimination than is possible in currently used arrangements. The air elimination effectiveness is further improved because the entire housing 10 above horizontal division plate 20 is used as the air eliminator housing rather than the small limited volume air eliminator housings currently in use. The advantage of a large volume housing is that it reduces turbulence and thereby facilitates air separation.

More specifically, those skilled in the art are aware that conventional fueling systems normally are arranged so that the filter water separator, the GO-NO-GO fuel cleanliness monitor, the air eliminator, and a meter are each in separate housings and downstream of each other in the order listed. Thus, it will be seen that the air eliminator is normally downstream of the filter water separator and GO-NO-GO fuel cleanliness monitor and upstream of the meter. In this location, the efficiency of the air eliminator is determined by the volume of the air eliminator housing and the back pressure due to the resistance to flow through the meter and interconnecting piping downstream of the air eliminator. Space limitations usually confine the volume of the air eliminator to less than one-tenth of a cubic foot. In the novel combination shown in FIGURE 1, the air eliminator has been located in the same housing with the filter water separator elements and GO-NO-GO fuses. The effective air separation volume in such an arrangement is approximately two cubic feet or twenty times as much as in an air eliminator located in a separate housing. However, in the arrangement shown in FIGURE 1, not only is the air separation efficiency increased by using a volume considerably greater, it is also increased because of the greater resulting back pressure. The back pressure will be the sum of the resistance to flow through the meter (not shown) and piping plus the pressure drop through the fuses 32. Normally, the resistance through the meter and piping is about 2 p.s.i. maximum. Adding the restriction through the GO–NO–GO gage fuses, which is approximately 5 p.s.i., this will increase the total restriction to about 7 p.s.i. to thereby provide more effective air separation. In addition, the previously described "scrubbing" effect of the fuses assures that even air bubbles as small as 5 microns in diameter will be separated from the fuel.

Under combat operation and in the event that there is no time to change the filter water separator elements, these elements may become overloaded and discharge solids or water into the effluent. Such solids and water will of course, be trapped by the GO–NO–GO fuses which act as a "second line of defense" or standby filter water separator. Although the contaminant holding capacity of the fuses is not as great as the much larger filter water separator elements, the holding capacity is usually sufficient to permit the fueling operations to be continued for lengthy periods and until the equipment can be serviced. On extremely rare occasions, when no service is obtainable for long periods and extremely dirty fuel has to be processed, then the fuses will also eventually shut-off because of the high contamination levels. When this occurs, further fuel flow through the fuses will be prevented. However, combat conditions may dictate that "dirty" fuel is better than no fuel and operating personnel may wish to override the shut-off feature of the GO–NO–GO fuses. This is accomplished by utilizing a manually operable shunt valve 46 which when unseated permits the fuel in chamber 26 to by-pass the fuses 32 and flow directly to outlet port 14. This valve is normally lock-wired in the closed position and can be opened only by breaking the lockwire.

The several practical advantages which flow from my invention are believed to be obvious from the previous description of the invention and other advantages may suggest themselves to those who are familiar with the art to which this invention relates.

Having thus described the various features of my invention, what I claim as new and desire to secure by Letters Patent is:

1. A fueler unit comprising a housing having a fuel inlet port, a fuel outlet port, a water drain port, and an air eliminator port, a horizontal division plate located in said housing for dividing said housing into a lower portion having said fuel inlet and outlet ports and an upper portion having said water drain and eliminator ports, a vertical division plate located below said horizontal division plate for preventing direct communication between said fuel inlet port and said fuel outlet port, a vertical partition member extending above said horizontal division plate for separating said housing into a first chamber located upstream of said air eliminator port and a second chamber located downstream of said air eliminator port, said first chamber communicating with said fuel inlet and water drain ports and said second chamber communicating with said fuel outlet port, a plurality of coalescer elements of the inside-out flow type located in said first chamber for trapping solid contaminants present in the fuel flowing therethrough from said inlet port to said second chamber and for coalescing any water contained in the fuel into relatively large droplets, a plurality of filter separator elements located in said first chamber and telescoped over and downstream of said coalescer elements for trapping any additional solid contaminants present in the fuel flowing from said coalescer elements and for separating said water droplets from said fuel so that said droplets can gravitate between said coalescer and separator elements towards said horizontal division plate and flow through said drain port, a plurality of porous contamination sensitive shut-off fuses located in said second chamber for monitoring the cleanliness of the fuel flowing therethrough and for separating air bubbles therefrom, said fuses being sufficiently sensitive to predetermined levels of both solid and water contaminants to cause closure of the pores therein when said predetermined levels are reached to thereby prevent fuel flow through said outlet port, and a float-operated valve located in the upper part of said first and second chambers and operatvely connected to said air eliminator port for permitting expulsion of air and fuel vapors from said housing, said float valve being adapted to shut-off flow through said air eliminator port when the fuel in said first and second chambers reaches a predetermined level to thereby prevent flow of fuel through said air eliminator port.

2. A fueler unit, as defined in claim 1, which includes a manually operable shunt valve located in said horizontal division plate for permitting direct communication between said second chamber and said fuel outlet port after said shut-off fuses have shut off and fuel is prevented from flowing therethrough.

References Cited by the Examiner

UNITED STATES PATENTS

| | | | |
|---|---|---|---|
| 1,405,259 | 1/1922 | Beach | 55—341 |
| 2,929,503 | 3/1960 | Ambruster et al. | 210—120 |
| 2,953,249 | 9/1960 | Topol et al. | 210—305 |
| 3,088,592 | 5/1963 | Clark | 210—316 X |
| 3,117,925 | 1/1964 | Kasten | 210—346 X |

REUBEN FRIEDMAN, *Primary Examiner.*

J. ADEE, *Assistant Examiner.*